(12) United States Patent
Bundy, Jr. et al.

(10) Patent No.: US 6,453,621 B1
(45) Date of Patent: Sep. 24, 2002

(54) WIND PROTECTION SYSTEM

(76) Inventors: Walter H. Bundy, Jr., P.O. Box 1559, Camden, SC (US) 29020; Lucas Smith, #31 27$^{th}$ Ave., Isle of Palms, SC (US) 29451

( * ) Notice: Subject to any disclaimer, the term of this patent is extended or adjusted under 35 U.S.C. 154(b) by 15 days.

(21) Appl. No.: 09/717,331

(22) Filed: Nov. 20, 2000

(51) Int. Cl.$^7$ ................................................ B62D 63/04

(52) U.S. Cl. .............................. 52/3; 52/4; 135/88.01

(58) Field of Search ................ 52/3, 4, DIG. 11, 52/23, DIG. 12; 135/87, 128, 115, 903, 121

(56) References Cited

U.S. PATENT DOCUMENTS

| | | | | |
|---|---|---|---|---|
| 1,106,624 A | * | 8/1914 | Cadwallader | |
| 5,579,794 A | * | 12/1996 | Sporta | 135/88.01 |
| 5,791,090 A | * | 8/1998 | Gitlin et al. | 52/4 |

* cited by examiner

Primary Examiner—Carl D. Friedman
Assistant Examiner—Steve Varner
(74) Attorney, Agent, or Firm—B. Craig Killough

(57) ABSTRACT

A wind protection system for covering a structure. The system, which is electronically activated, comprises primarily a pair of extendable poles located on opposite sides of the structure, and a sheet of flexible netting stored on a reel. Cables attached to the netting pull it up and over the tops of the extended poles when the system is activated and when the poles are retracted, pull the netting down and over the structure to form a protective tent.

7 Claims, 3 Drawing Sheets

WIND PROTECTION SYSTEM

FIELD OF THE INVENTION

This invention relates to the field of wind protection systems for structures, and more particularly, to a remotely activatable system having a flexible covering attached to extendable poles, and cables attached to the covering and running to and over those poles, so that the covering can be pulled over the structure to cover it like a tent.

BACKGROUND OF THE INVENTION

It is well known that one of the best ways to prevent an object from being blown away is to tie it down, whether the invention is a trash can, a tent or a trailer. The tie-down, be it rope or cable, must be secured to a more stable object, such as a rock or tree, by means of a stake or a weight, or have one or more ends of the rope or cable buried in the earth. Strong netting which is restrained by tie downs can also so be used to further protect the structure and any objects within the structure from wind damage.

Other means for protection for structures include fastening rigid sheets of materials, such as plywood, to structurally vulnerable portions of the structure, such as windows and doors. There are two major problems with either of these approaches to wind protection. First, the coverings are time-consuming to erect, and therefore must be erected well in advance of a projected storm. Secondly, the owner or manager of the structure in question must be there personally to erect such a system, or he or she must have someone who will be able to personally erect the protection. Thus, it is an object of the present invention to provide a remotely activatable wind protection system for a structure, which can speedily be erected when the need for wind protection for the structure becomes apparent.

SUMMARY OF THE DISCLOSURE

The present invention is an inter-related system made up of a flexible netting covering attached to cables which can be pulled over extendible poles and that can be remotely and activated to form a secure tent like covering over a structure. Pneumatically telescoping poles are placed at ends of the structure. The cables, when extended by the poles, pull the netting over the structure to form a tent like framework covering the structure. The flexible fabric covering is stored underground on a reel when not in use. In use, the covering is extended along and between the cables, forming a strong and protective tent over the structure. All components are anchored into the ground. A video camera and computer controller monitor and activate computer controlled machinery to position and retract the protection system.

DETAILED DESCRIPTION OF THE PREFERRED EMBODIMENT

Figure 1:
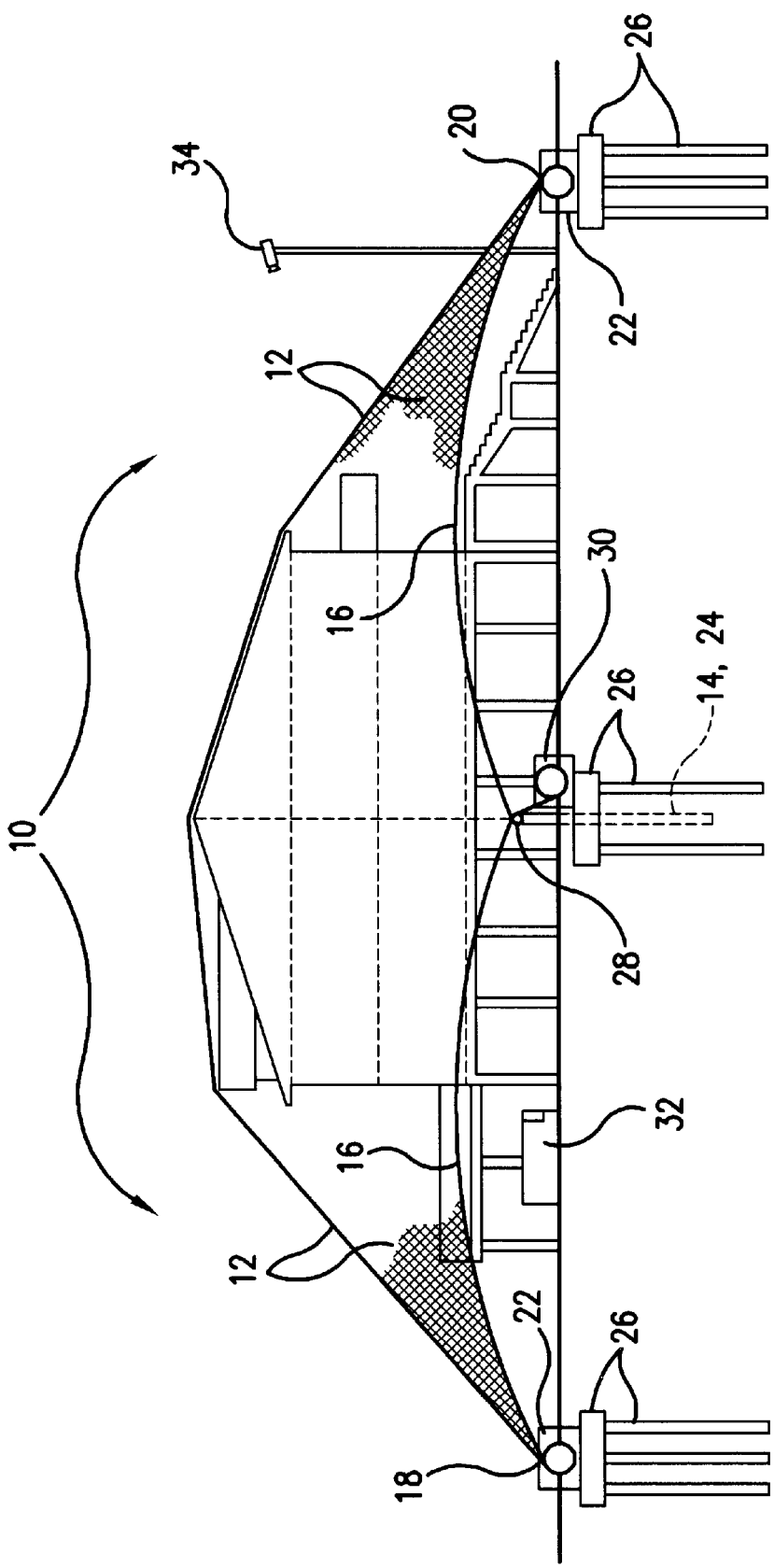
FIG. 1 shows a simplified, side view of the wind protection system of the invention.
Figure 3:
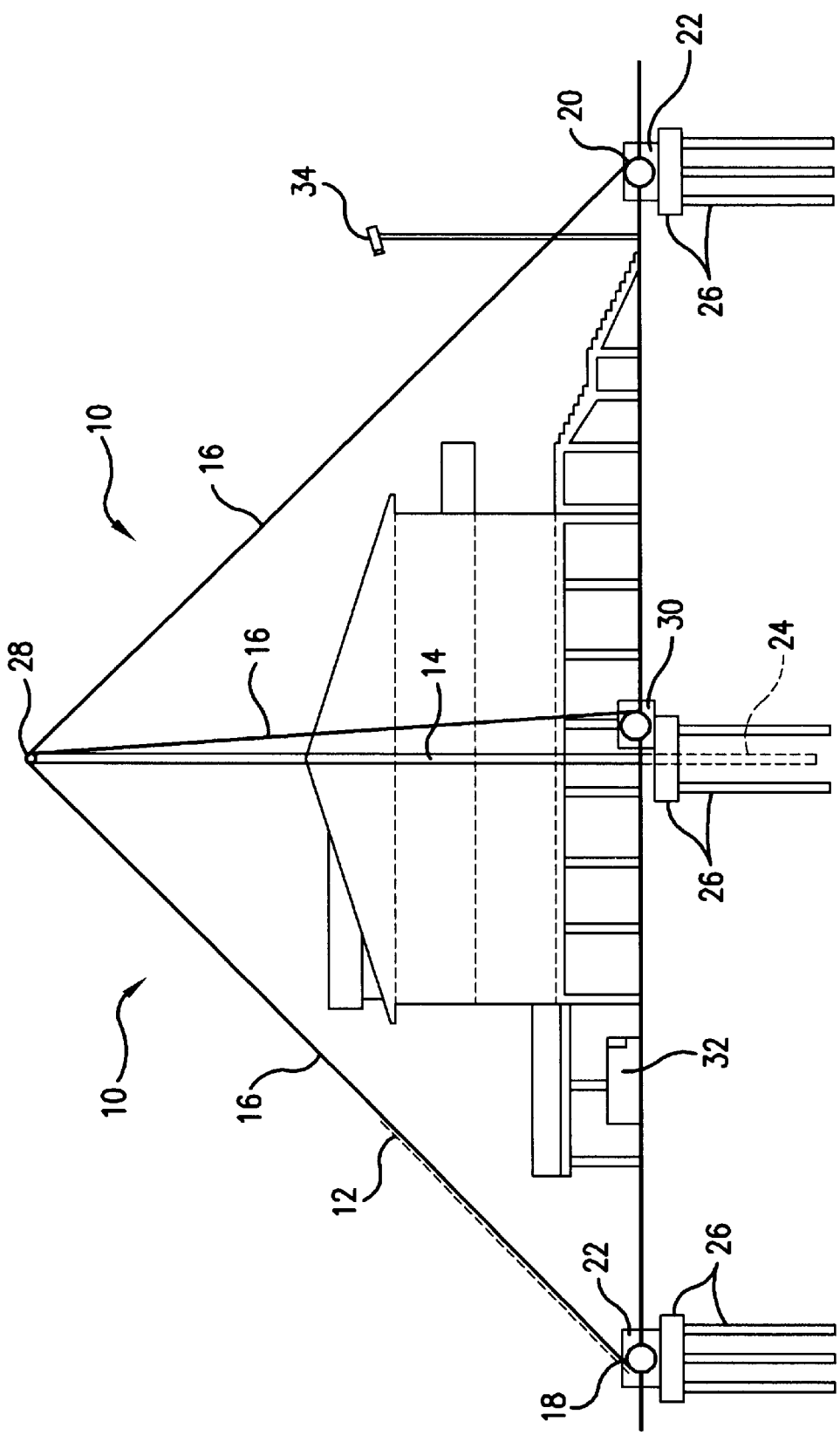
FIG. 3 shows the wind protection system with the support poles in their extended position.

In the drawing figures, like numbers are used to indicate like components. FIGS. 1 and 3 show one side of the structure and the system components. Since the system is, in many respects, mirror imaged, the component and operational descriptions refer to both sides and contained within the stainless steel housing that open at the top when the system is activated.

Figure 2:
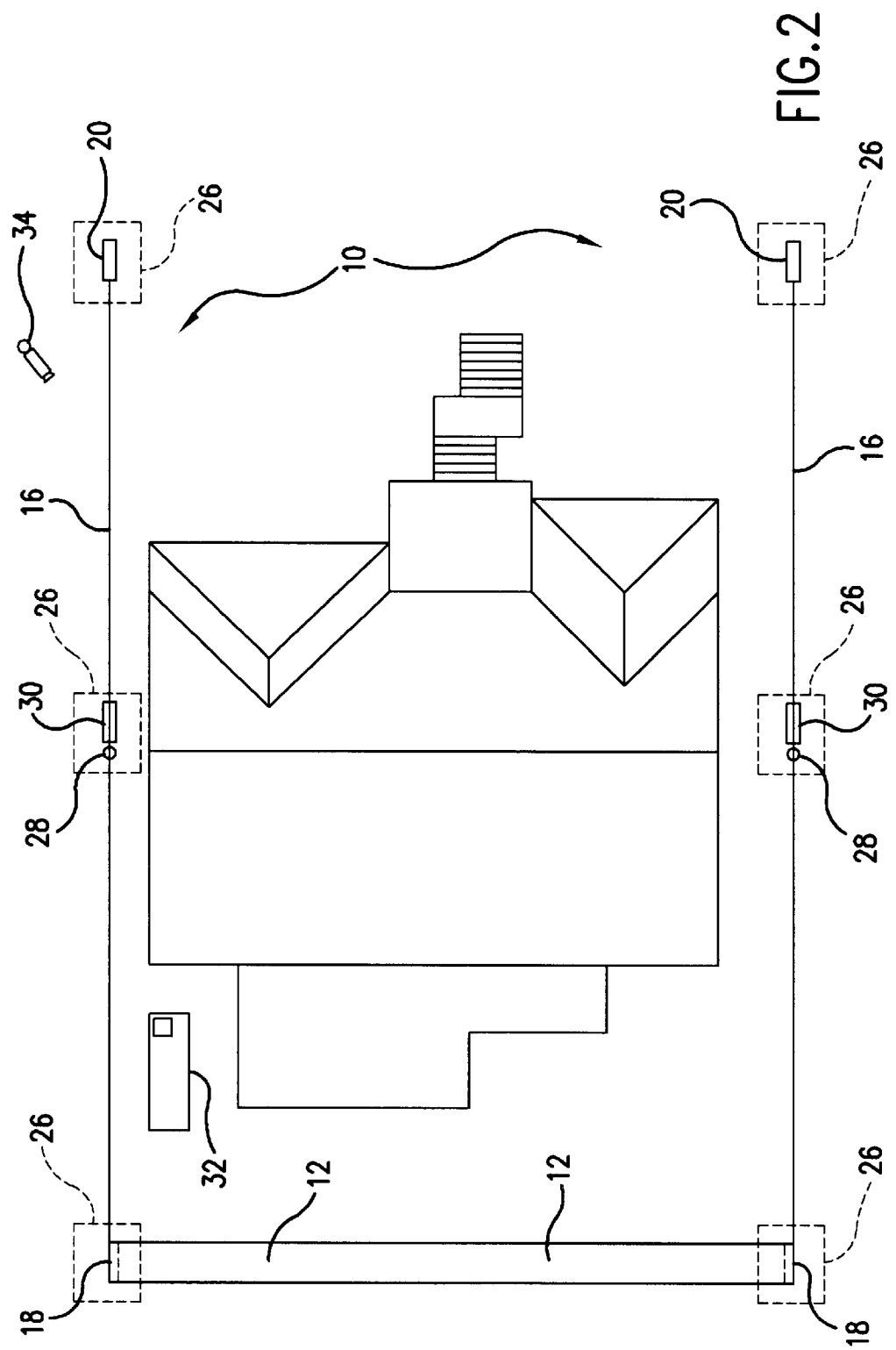
FIG. 2 shows a simplified, top plan view of the system.

FIG. 1 shows wind protection system in the "structure secured" position, after activation. FIG. 2 shows wind protection system 10 after activation but before it has been placed in "structure secured" position.

FIG. 2 shows wind protection system 10 as viewed from above. Some components shown in FIGS. 1 and 3 are not visible in FIG. 2.

As shown in FIG. 1, wind protection system 10 has three major structural components: sheet of flexible netting 12 (of which, for simplicity, only the two ends are indicted), extendable poles 14, and support cables 16, which are attached to the sides of sheet of flexible netting 12, and a flexible covering, the entire system thus reversibly covering a structure, like a tent.

Support cables 16 are attached at one end to netting reel 18 at one end to netting reel 18 and at the other end to cable reels 20 (as FIG. 2 shows). Support cables 16 are operationally attached to both netting reel 18 and cable reel 20 by winching means. Netting reel 18 and cable reel 20 are located within reel housings 22 which are positioned on opposite ends of the structure and are recessed into the ground.

Extendable poles 14 are also located on opposite sides of the structure (at right angles to the reels, as is shown on FIG. 2). Extendable poles 14 are located within pole housings 24, which allow poles 14 to be partially retracted into the ground. Rotatable pole pulley 28 is located at the end of extendable pole 14. Pole pulley 28 is operated by pulley winch 30. All housings are anchored into the ground with concrete cap and pilings 26

Each support cable 16 is attached to flexible sheet of netting 12. Sheet of flexible netting 12 is, for storage, rolled on to and upon activation, released from, netting reel 18 and contained within the stainless steel housing. Cables 14 are attached along the sides of sheet of flexible netting 12.

The system is activated either directly (computer controller 32 is activated) or remotely. Remote activation is made possible by observations of the structure which are transmitted to an offsite viewer via digital camera over the Internet, each location will have its own website for continuous observation. When that viewer observes the effects of high winds on the structure (usually vibrations but including roof tile loss), he activates computer controller via telephone modem 32. Automatic activation is also possible if a wind speed detector is connected to computer controller 32 and the system is activated when a predetermined wind speed is reached.

Once the system is activated, extendable poles 14 telescopes upwards to height just above the highest point of the structure and simultaneously, cables 16 are drawn up from their pre-activation (and after de-activation) resting locations along the sides of the structure. As poles 14 are being extended they pull cables 16 up with them. When poles 14 are fully extended (as shown in FIG. 3), cable winches 30 activate and pull cables 16 over rotatable pole pulley 28 and down toward cable reels 20. This pulls sheet of flexible netting 12 from its stored and rolled position on the netting reel 18 located in the stainless steel housing up over pole pulley 28 and down toward cable reels 20. When the netting reaches cable reels 20, the reels activate and tighten cables 16. This tightening forces extendable, and now extended, poles 14 to retract. Sheet of flexible netting 12 is thus pulled down and around the structure, as shown in FIG. 1. The system is now in its "locked down" configuration.

When the winds or other condition has abated, the system is unlocked by reversing the activation sequence.

Other modifications to or adaptations of the wind protection system will become apparent to those skilled in the art from an examination of the above patent specifications and drawings. Therefore, other variations of the present invention may be made which fall within the scope of the following claims, even though such variations were not specifically discussed above.

What is claimed is:

1. A wind protection system for a structure comprising:

a single sheet of flexible netting of sufficient length and breadth to cover a structure to be protected, a netting reel located on one side of the structure, the netting reel being of sufficient size that the sheet of flexible netting may be rolled and stored upon the reel;

a stainless steel waterproof housing to store and protect the netting when not in use;

a cable reel located on the opposite side of the structure from the netting reel, a pair of netting cables, each of said netting cables positioned on an opposite side of the structure, and each of said netting cables affixed at one end to the cable reel and at the other end to the fabric netting on the netting reel from its stainless steel housing upon the netting reel, a pair of extendable poles located at opposite sides of the structure, the top end of each pole having located thereupon a rotatable pulley which is connected to the mid-portion of the netting cable and the bottom end of each pole being secured to the ground alongside the structure.

2. A wind protection system according to claim 1, further comprising a motor which communicates with said extendable poles and which causes the extendable poles to be extended from a collapsed configuration, in which the poles have been retracted to the level of the ground beside the structure to an extended position, in which the tops of the poles extend above the top of the structure, such motor further being capable of reversing such extension.

3. A wind protection system according to claim 2, further comprising a second motor which causes the sheet of flexible netting to be released from its storage location upon the netting reel when the extendible poles are extended and, by force applied to the cable reel upon the netting cables, drawn up over the tops of the extendable poles and over the top of the structure toward the cable reel.

4. A wind protection system for a structure comprising:

a single sheet of flexible netting of sufficient length and breadth to cover a structure to be protected, a netting reel located on one side of the structure, the netting reel being of sufficient size that the sheet of flexible netting may be rolled and stored upon the reel;

a cable reel located on the opposite side of the structure from the netting reel, a pair of netting cables, each of said netting cables positioned on an opposite side of the structure, and each of said netting cables affixed at one end to the cable reel and at the other end to the fabric netting on the netting reel, a pair of extendable poles located at opposite sides of the structure, the top end of each pole having located thereupon a rotatable pulley which is connected to the mid-portion of the netting cable and the bottom end of each pole being secured to the ground alongside the structure;

means for causing the extendable poles to be extended from a collapsed configuration, in which the poles have been retracted to the level of the ground beside the structure to an extended position, in which the tops of the poles extend above the top of the structure, such means further being capable of reversing such extension, and means for causing the sheet of flexible netting to be released from its storage location upon the netting reel when the extendible poles are extended and, by force applied to the cable reel upon the netting cables, drawn up over the tops of the extendable poles and over the top of the structure toward the cable reel.

5. A wind protection system according to claim 3 wherein the motor for extending and retracting the extendable poles and the second motor for releasing the fabric netting from the netting reel and drawing that netting up over the structure and down toward the cable reel are all remotely activatable.

6. A wind protection system according to claim 4 wherein the means for extending and retracting the extendable poles and the means for releasing the fabric netting from the netting reel and drawing that netting up over the structure and down toward the cable reel are all remotely activatable.

7. A wind protection system according to claim 1 wherein the cable reel, the netting reel, the extendable poles and the netting cables are all located in below ground with recesses adjoining the structure.

\* \* \* \* \*